Patented July 24, 1934

1,967,617

UNITED STATES PATENT OFFICE 1,967,617

MANUFACTURE OF DIBENZANTHRONE DERIVATIVES

Edward T. Howell, Milwaukee, Wis., assignor to E. I. du Pont de Nemours & Company, Wilmington, Del., a corporation of Delaware No Drawing. Application December 27, 1932, Serial No. 648,977

11 Claims. (Cl. 260—61)

This invention relates to the manufacture of dyestuff compounds of the dibenzanthrone series. More particularly, this invention deals with a process for the manufacture of Bz2,Bz2'-dihydroxy-dibenzanthrone which is valuable as an intermediate for the production of vat dyestuffs of the so-called "Jade green" series.

It is an object of this invention to provide an efficient and economical process for the manufacture of Bz2,Bz2'-dihydroxy-dibenzanthrone using benzanthrone as initial material.

It is a further object of my invention to improve the known process of converting benzanthrone into dihydroxy-dibenzanthrone by way of intermediate formation of Bz1,Bz1'-dibenzanthronyl, whereby to increase the purity and tinctorial yield of the final product.

Other and further important objects of this invention will appear as the description proceeds.

The conversion of benzanthrone into dibenzanthrone, and the further oxidation of the latter to Bz2,Bz2'-dihydroxy-dibenzanthrone has received considerable attention in the art. Among others, the following process has been known and used:

Benzanthrone is oxidized by the aid of manganese dioxide in concentrated sulfuric acid to give a product consisting chiefly of Bz1,Bz1'-dibenzanthronyl. The latter, after preliminary treatments to eliminate readily removable by-products, is fused with alcoholic potash and then aerated in the usual manner to give dibenzanthrone. The latter in turn is again treated with manganese dioxide and sulfuric acid to give an oxidized dibenzanthrone body which after partial reduction with a bisulfite in the manner set forth in U. S. Patent No. 1,093,427 constitutes Bz2,-Bz2'-dihydroxy-dibenzanthrone.

In this process it has been the general practice to carry the first oxidation step as nearly to completion as possible, with the obvious motive of producing a maximum quantity of Bz1,Bz1'-dibenzanthronyl. The rule generally followed has been to continue the reaction until substantially no unchanged benzanthrone remained over.

It has been observed in this reaction that the product obtained in the first oxidation step was never pure Bz1,Bz1'-dibenzanthronyl. Invariably, higher oxidation products would be formed along with the main product. These have been designated in the art as oxy-benzanthrone and oxy-dibenzanthronyl, although their constitution is indeed somewhat doubtful. For instance, the so-called "oxy-benzanthrone" will not dissolve in caustic soda solution until first reduced by the aid of bisulfite, in the same manner, for instance, as the "oxy-dibenzanthrone" of U. S. Patent No. 1,093,427. The so-called "oxy-dibenzanthronyl" body is barely soluble in alkali.

It has therefore been the practice in the art to purify the first oxidation product, before subjecting the same to caustic fusion, by reducing with sodium bisulfite and then extracting the mass by the aid of sodium hydroxide solution. In this manner most of the oxy-benzanthrone by-product is removed. The oxy-dibenzanthronyl body, however, stays in the main reaction product and contaminates the dibenzanthrone eventually produced in the fusion step. The effect of this impurity becomes particularly noticeable after oxidation of the fusion mass according to the third step of the procedure above outlined. But worst of all and most damaging is the effect when the dihydroxy-dibenzanthrone is alkylated, say methylated, to produce a dyestuff of the Jade green series. The presence of the impurity causes the shade to be dull and the tinctorial value to be low.

Various attempts have been made in the art to diminish the quantity of by-products obtained in the above reaction. Oxidation under relatively mild conditions has been suggested in U. S. Patent No. 1,607,491. Effecting the oxidation at about 0° C. is the remedy proposed in British Patent No. 278,112. The use of manganic sulfate "in a correspondingly diminished proportion and in the cold" is the solution offered by British Patent No. 315,433. All these suggestions undoubtedly have some merit. Nevertheless, the problem remained unsolved, and according to my best experience, all the methods above noted lead to a product containing appreciable quantities of the undesirable alkali-insoluble by-product.

I have now found that very pure dihydroxy-dibenzanthrone of increased tinctorial yield may be obtained from benzanthrone by way of Bz1-Bz1'-dibenzanthronyl, if the process is conducted under such conditions as to leave the reaction incomplete in the first oxidation step. In other words, I have found that if the first step of the above systematic process, namely the oxidation of benzanthrone by means of manganese dioxide and sulfuric acid, is conducted under still milder conditions than those indicated in the art, more particularly under conditions leaving substantial amounts of unreacted benzanthrone in the mass, the latter when subjected to fusion and oxidation in the usual manner gives a dihydroxy-dibenzanthrone of great purity and increased yield. Evidently, the undesirable alkali-insoluble higher oxidation products are not formed to any substantial degree under the mild conditions of reaction according to my invention.

The mild conditions requisite for my invention may take one of two forms. According to one method sulfuric acid of about 80% concentration is used as solvent in the first oxidation step. The time of reaction then need not be particularly limited. According to the other method the reaction proceeds along well known lines, using concentrated sulfuric acid, but the reaction is not permitted to continue until full consumption of the benzanthrone. Instead, the reaction mass is diluted, drowned in water, or otherwise made to discontinue the reaction, at that instant when the amount of unreacted benzanthrone is still about 30 to 40% of the initial quantity. Aside from these two points, some or all of the mild conditions mentioned in the art may be used such as the employment of low temperatures (0° to 5° C.), avoiding excessive quantities of the oxidizing agent, use of manganic sulfate instead of manganese dioxide, etc. These additional mild conditions are particularly desirable in that modification of my invention wherein concentrated sulfuric acid is used, and the extent of the reaction is controlled by the time element.

The above observation is of a paradoxical nature, and could not very well be foreseen. Offhand, it appears that in an effort to eliminate an objectionable impurity (oxy-dibenzanthronyl) from the main product, a larger proportion of another impurity is introduced, namely unreacted benzanthrone. It turns out, nevertheless, that this impurity, although of an entirely different nature from Bz1,Bz1'-dibenzanthronyl (as may be readily seen by comparing their formulas:

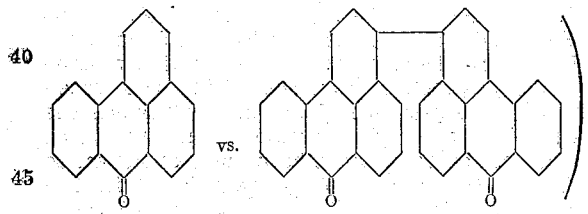

when subjected to the same subsequent treatment, namely consecutive fusion and oxidation, yields the same final product, namely Bz2,Bz2'-dihydroxy-dibenzanthrone. Thus, although the product of the first step in my improved process is a mixture of two different products, the final product of my process is a singular, uniform product. It is probable that it was this very paradox, annunciated in the last sentence, that led the earlier investigators in this field to continue the reaction until substantially all the initial benzanthrone has been consumed.

The above effect is further particularly surprising in view of the fact generally known that when benzanthrone is oxidized by means of manganese dioxide and dilute sulfuric acid, formation of oxy bodies is favored. German Patent 515,327 takes advantage of this very fact to produce oxy-benzanthrone in good yield, substantially free of Bz1,Bz1'-dibenzanthronyl. This patentee observed that "the formation of Bz1,Bz1'-dibenzanthronyl recedes as the concentration of the sulfuric acid employed diminishes". It was hardly to be foreseen that the lower concentrations, which apparently favor the formation of oxy-benzanthrone, would disfavor the formation of oxy-dibenzanthronyl. Nor was it at all known that the formation of oxy-dibenzanthronyl enters in at a certain deferred stage of the oxidation instead of at the very beginning, whereby to enable one to separate this side reaction from the main reaction by limiting the time of reaction.

Accordingly, my invention may be said to comprise a systematic process for the manufacture of dihydroxy-dibenzanthrone by starting with a unitary initial material, producing during the course of the process a mixture of two main components, and further reacting upon this mixture in such a manner as to produce a substantially unitary final product. I accomplish my object by oxidizing benzanthrone under conditions leading mainly to a mixture of Bz1,Bz1'-dibenzanthronyl and unreacted benzanthrone, without substantial quantities of alkali-insoluble higher oxidation products (oxy-dibenzanthronyl) and with but small quantities of alkali-soluble higher oxidation products (oxy-benzanthrone). The latter are then removed in the usual manner, such as reduction with bisulfite and extraction with aqueous alkali, and the residual mixture of benzanthrone and Bz1,Bz1'-dibenzanthronyl is subjected to caustic fusion. The latter step is carried out in the usual manner, such as heating with caustic potash and alcohol, preferably in the presence of inert diluents, or basic substances, such as kerosene, naphthalene, diphenylamine, sodium or potassium acetate, and the like. The fusion mass is worked up in the usual manner, including the usual aeration step, and is then oxidized by means of manganese-dioxide and dilute sulfuric acid (80 to 88%) for instance according to the process described in copending application of Goodrich and Kinahan, Ser. No. 303,950.

It will be understood that although I am speaking above of a benzanthrone oxidation product consisting substantially of two components, I am not implying that it is absolutely free of other by-products. Unquestionably, certain amounts of oxy-benzanthrone are formed along and must be removed as above indicated prior to the fusion step. Very likely, certain amounts of the objectionable oxy-dibenzanthronyl bodies are formed also, the precise amount depending on the moment of time selected for stopping the reaction. Nevertheless the amounts of impurities thus formed are considerably less than by the hitherto practiced processes, as can be readily ascertained by comparing the tinctorial yields of the final products. In actual practice I have found the tinctorial yield of "Jade green" obtainable from dihydroxy-dibenzanthrone prepared according to this invention to be fully 30 to 40% greater than the tinctorial yield where the Bz1,Bz1'-dibenzanthronyl has been prepared by the previous processes of the art. It will be understood of course that tinctorial yield is a quantitive property taking into consideration both the weight or mass of the product produced as well as its state of purity.

It will be further understood that although I prefer for the sake of simplicity and economy, and in view of the paradoxical discovery above noted, to alkali-fuse the mixture of benzanthrone and dibenzanthronyl directly as obtained by my process except for the intermediate purification step to remove oxy-benzanthrone, I do not exclude from my invention the process wherein the two main components are separated prior to fusion. The point is that benzanthrone is much more readily removable from Bz1,Bz1'-dibenzanthronyl than is oxy-dibenzanthronyl. The former may for instance be readily removed by extraction with toluene. This invention therefore embraces the process wherein one, after the first oxidation step, proceeds to remove both the oxy-benzanthrone and unchanged benzanthrone, and then fuses the substantially unitary Bz1,-Bz1'-dibenzanthronyl.

The processes of controlling the first oxidation step so as to produce mainly a mixture of benzanthrone and Bz1,Bz1'-dibenzanthronyl are described more fully and claimed in my copending application, Ser. No. 648,978, filed of even date herewith. They are also specifically illustrated in the examples below. Generally speaking, they comprise one of two controls: An acid-concentration control and a time control.

In the acid-concentration control method, sulfuric acid of about 80% concentration is employed. This concentration may vary by 1 or 2 per cent either way, say from 78 to 83%. The time of the reaction in this case need not be rigidly controlled. Nor is it necessary to work with diminished quantities of manganese dioxide in this method. On the contrary, slight excesses up to 50% may be employed without injury.

In the time control method the initial ingredients may be the same as in any of the previous methods in the art. Diminished quantities of oxidizing agent and low temperatures are particularly desirable. The time allowed for the ingredients to be in contact, however, should be cut down to but a fraction of the time prescribed in the art for each respective process. Another way of determining the time limit is to take samples of the oxidation mixture, and to discontinue the reaction (as by dilution or drowning in water) as soon as the amount of benzanthrone present drops below say 40 to 30% of the initial quantity. The color of the reaction mass, after some experience with the process, may also be used as a guide to determine the desirable end point.

Without limiting my invention to any particular procedure, the following examples are given for the purpose of illustrating the same. Parts given are by weight.

Example 1

100 parts of purified benzanthrone (M. P. 168–170° C.) are dissolved in 2400 parts of 80% sulfuric acid, and cooled to 2° C. 60 parts of finely powdered pyrolusite (86–87% MnO$_2$) are then added during a period of 7–8 hours at 2–4° C., and the reaction mixture is stirred for 15 to 20 hours longer at that temperature. Microscopic examination at this stage shows well defined hair-like crystals. The reaction mixture is then poured into 12,000 parts of water, treated with 50 parts of sodium bisulfite, brought to a boil, and diluted with 12,000 parts of cold water, filtered, and washed acid-free. Alkali-soluble impurities are then removed by digesting the filter cake in 5000 parts dilute caustic soda solution, boiling, filtering, washing and drying. The product so obtained consists of a yellowish brown powder containing approximately 70% of substantially pure Bz1,Bz1'-dibenzanthronyl together with approximately 30% unchanged benzanthrone.

Example 2

100 parts of purified benzanthrone (M. P. 168–170° C.) are dissolved in 2000 parts of 94% sulfuric acid and cooled to 2° C. There are then added 40 parts of finely ground pyrolusite (86–87% MnO$_2$) during a period of 3 hours at 2–5° C. After stirring 1 hour more at 2–5° C., the reaction mixture is poured into 10,000 parts of water, treated with 40 parts sodium bisulfite, brought to a boil, diluted with 10,000 parts of cold water, filtered, washed acid-free and dried. If desired, an alkali extraction, following substantially the same procedure as in Example 1, may be carried out at this point prior to drying. The product so obtained consists of a yellowish brown powder containing approximately 65% Bz1,Bz1'-dibenzanthronyl and approximately 35% unchanged benzanthrone.

Example 3

10 parts of the product of Example 1 or 2 are added at 90–95° C. to a melt of 20 parts of methanol; 5 parts of fused potassium acetate and 30 parts of caustic potash flakes, charged in the order given. The temperature is then raised to 130° C. and the reaction mixture is stirred ½ hour at 130–135° C., after which it is drowned in cold water, aerated until the dyestuff is completely precipitated, filtered, and washed. The filter cake may be used directly in the following oxidation step.

Example 4

A filter cake, obtained as in Example 3, containing 10 parts of solids and 30 parts of water is digested with cooling in 280 parts of 93% sulfuric acid. When the mixture is uniform and has been cooled to at least 15° C., there are added 12 parts of finely powdered pyrolusite (86–87% MnO$_2$) during about 2 hours at 10–15° C. When the addition is complete the oxidation mixture is allowed to warm up to 20–25° C. and is stirred for 10 to 15 hours at that temperature. Examination under the microscope at this stage shows well defined needle-like crystals with practically clear background. The reaction mixture may now be worked up either by filtering directly on a porous plate filter, followed by digestion in water and boiling with 12 parts of sodium bisulfite and filtering; or it may be drowned in water, boiled with 12 parts of sodium bisulfite, filtered and washed with water.

The product so obtained consists of dihydroxy-dibenzanthrone of great technical purity, which is shown by the fact that when it is methylated, for instance, according to Example 1 of U. S. Patent No. 1,531,261, Jade green is obtained in 30–40% greater tinctorial yield than that obtained when employing Bz1,Bz1'-dibenzanthronyl made by hitherto known processes.

Example 5

The oxidation of benzanthrone is carried out as in Example 1. Instead, however, of drowning the reaction mixture, it is diluted by adding 165 parts of water during 3 to 5 hours, while maintaining the temperature at 2–4° C., and then filtered on a porous plate filter, during which procedure unchanged benzanthrone passes through in the filtrate. After washing with 75–80% sulfuric acid, and sucking as dry as possible, the filter cake is digested in water, boiled with excess sodium bisulfite, filtered, washed acid-free, and dried. The product so obtained consists of a yellowish powder, crystallizable from nitrobenzol in golden yellow needles, having a melting point of 425° C., and soluble in concentrated sulfuric acid with a brilliant deep cherry red color and reddish fluorescence.

If the strong acid filtrate is drowned in water, boiled with bisulfite, filtered and washed first with water, then with dilute caustic soda solution, unchanged benzanthrone is recovered which may be used in subsequent oxidations to produce further quantities of Bz1,Bz1'-dibenzanthronyl.

*Example 6*

The pure Bz1,Bz1'-dibenzanthronyl as obtained in Example 5 is subjected to alcoholic potash fusion as described in Example 3, and the fusion product is further oxidized as set forth in Example 4. If the resulting dihydroxy-dibenzanthrone is methylated, for instance, by the process of Example 1 of U. S. Patent 1,531,261, it gives Jade green in a tinctorial yield roughly twice as great as that obtained from the 13,13'-dibenzanthronyl obtained for example according to British Patent No. 278,112.

It will be understood that many variations and modifications are possible in the specific mode of operation, without departing from the spirit of this invention.

I claim:

1. In the process of producing Bz2,Bz2'-dihydroxy-dibenzanthrone the step which comprises alkali-fusing a mixture of benzanthrone and Bz1,Bz1'-dibenzanthronyl as is obtainable by incomplete oxidation of benzanthrone, in acid solution under conditions which give no substantial amount of oxidation products higher than Bz1,Bz1'-dibenzanthronyl.

2. In the process of producing Bz2,Bz2'-dihydroxy-dibenzanthrone the step which comprises alkali-fusing an incompletely oxidized benzanthrone reaction product as obtainable by oxidizing benzanthrone with manganese dioxide at 0 to 5° C. in sulfuric acid of about 80% strength.

3. In the process of producing Bz2,Bz2'-dihydroxy-dibenzanthrone the step which comprises alkali-fusing an incompletely oxidized benzanthrone reaction product as obtainable by oxidizing benzanthrone with manganese dioxide at 0 to 5° C. in concentrated sulfuric acid, and discontinuing the reaction at a moment when the amount of unreacted benzanthrone has not yet dropped below 30% of the initial amount.

4. In the process of producing Bz2,Bz2'-dihydroxy-dibenzanthrone the step which comprises alkali-fusing a benzanthrone oxidation product comprised chiefly of Bz1,Bz1'-dibenzanthronyl but containing no substantial amounts of higher oxidation products.

5. In the process of producing Bz2,Bz2'-dihydroxy-dibenzanthrone the step which comprises alkali-fusing a mixture of benzanthrone and Bz1,Bz1'-dibenzanthronyl, substantially free of oxy-dibenzanthronyl bodies.

6. The process of producing Bz2,Bz2'-dihydroxy-dibenzanthrone, which comprises oxidizing benzanthrone in acid solution under conditions which give no substantial amount of oxidation products higher than Bz1,Bz1'-dibenzanthronyl, and stopping the reaction while a substantial amount of benzanthrone remains unchanged in the reaction mass, whereby a mixture of benzanthrone and Bz1,Bz1'-dibenzanthronyl is formed, subjecting the mixed product to caustic fusion, and oxidizing the intermediate fusion product thus obtained.

7. The process of producing Bz2,Bz2'-dihydroxy-dibenzanthrone, which comprises oxidizing benzanthrone in acid solution under conditions which give no substantial amount of oxidation products higher than Bz1,Bz1'-dibenzanthronyl, and stopping the reaction while a substantial amount of benzanthrone remains unchanged in the reaction mass, whereby a mixture of benzanthrone and Bz1,Bz1'-dibenzanthronyl is formed, recovering from the oxidation mass a product comprised chiefly of Bz1,Bz1'-dibenzanthronyl, but substantially free of oxy-benzanthrone, and subjecting said product consecutively to caustic fusion and oxidation by means of manganese dioxide in sulfuric acid.

8. The process of producing Bz2,Bz2'-dihydroxy-dibenzanthrone which comprises oxidizing benzanthrone with manganese dioxide and sulfuric acid of about 78 to 83% strength, removing from the product any alkali-soluble by-products that may be present, and subjecting the residual mixture to consecutive caustic fusion and oxidation by means of manganese dioxide and sulfuric acid.

9. The process of producing Bz2,Bz2'-dihydroxy-dibenzanthrone which comprises oxidizing benzanthrone at 0 to 5° C. with manganese dioxide and concentrated sulfuric acid until a point is reached where the quantity of unchanged benzanthrone drops to between 30 and 40% of its initial value, recovering the mixed oxidation mass, removing therefrom alkali-soluble impurities, subjecting the residual mass to caustic fusion and then to oxidation by means of manganese dioxide and sulfuric acid.

10. The process of producing Bz2,Bz2'-dihydroxy-dibenzanthrone which comprises dissolving benzanthrone in sulfuric acid of about 80% strength at about 2° C., adding an excess of manganese dioxide, stirring the mass in the cold until no further reaction is evident, pouring the mass into water, reducing it with sodium bisulfite, extracting alkali-soluble matter by the aid of dilute aqueous alkali, fusing the residue at about 130° to 135° C. in a melt of methanol, potassium acetate and caustic potash, aerating, recovering the precipitate, and reacting upon the latter with manganese dioxide in substantially 85% sulfuric acid at about 15° C., and recovering the dyestuff.

11. The process of producing Bz2,Bz2'-dihydroxy-dibenzanthrone which comprises dissolving benzanthrone in sulfuric acid of about 94% strength at about 2° C., adding not above the theoretical quantity of manganese dioxide, stirring the mass in the cold until the amount of unreacted benzanthrone in the mass has dropped to about 30 to 40% of its initial value, pouring the mass into water, reducing it with sodium bisulfite, extracting alkali-soluble matter by the aid of dilute aqueous alkali, fusing the residue at about 130° to 135° C. in a melt of methanol, potassium acetate and caustic potash, aerating, recovering the precipitate, and reacting upon the latter with manganese dioxide in substantially 85% sulfuric acid at about 15° C., and recovering the dyestuff.

EDWARD T. HOWELL.